Feb. 15, 1927.
R. G. MILLER
EGG TURNING DEVICE FOR INCUBATORS
Original Filed Aug. 28, 1922
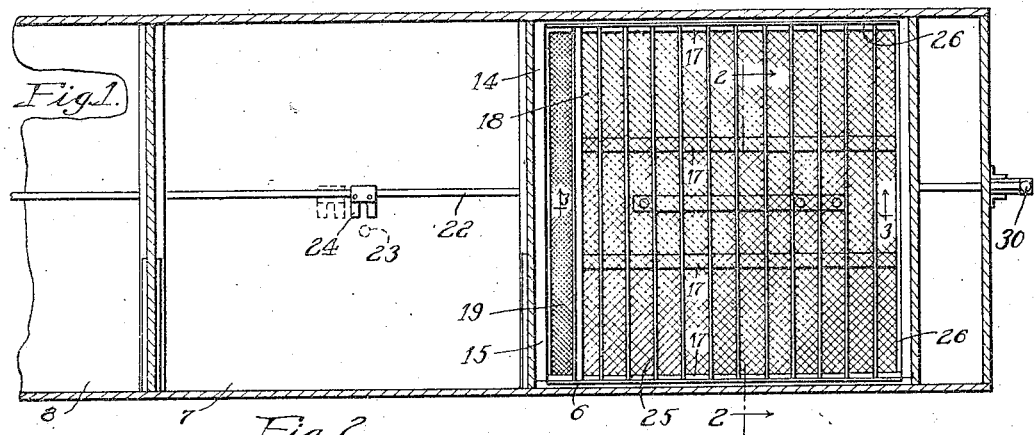
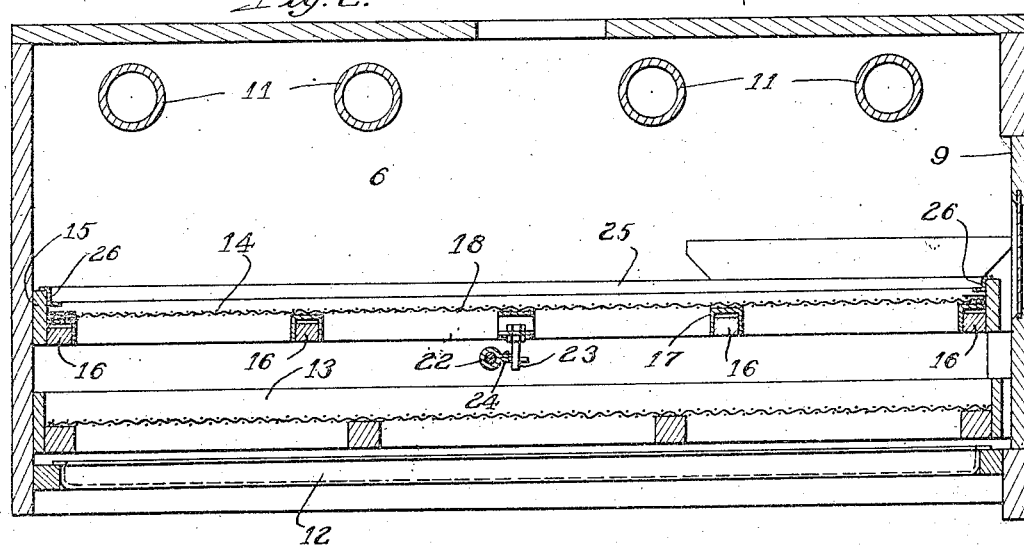
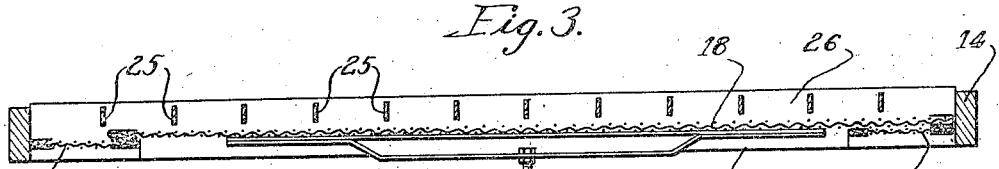
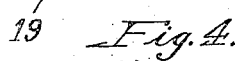
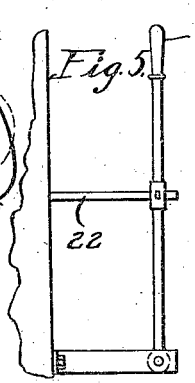

Patented Feb. 15, 1927.

1,617,920

UNITED STATES PATENT OFFICE.

ROY G. MILLER, OF ROCKFORD, ILLINOIS, ASSIGNOR TO J. W. MILLER COMPANY, OF ROCKFORD, ILLINOIS, A CORPORATION OF ILLINOIS.

EGG-TURNING DEVICE FOR INCUBATORS.

Continuation of application Serial No. 584,704, filed August 28, 1922. This application filed February 28, 1925. Serial No. 12,528.

This application is a continuation of application Serial Number 584,704, filed August 28, 1922.

This invention relating in general to incubators, has more particular reference to means for turning the eggs, especially in a mammoth incubator having many egg compartments.

The primary object of my invention is to provide a generally improved egg-turning device which may be used in an incubator of one or more egg compartments, but especially adapted for mammoth incubators. I have aimed to provide a simple and practical construction, which may be economically produced, has a comparatively large egg capacity, and will function in such manner as to insure a relatively large hatch.

One of the features of my invention resides in the mounting and construction of the egg-supporting tray with the view to supporting the eggs in a most advantageous manner and to permit the desired turning of the eggs. I have also aimed to so mount the egg tray that it may be positioned in the egg compartment either in or out of operative relation to the means which is operated by the attendant for turning the eggs.

Another feature of my invention is the provision of a novel egg-turning device, the advantages of which will be better understood by those skilled in this art by referring to the following description and drawings, in which—

Figure 1 is a horizontal sectional view through an incubator embodying my invention;

Fig. 2 is an enlarged vertical section through the incubator taken substantially on the line 2—2 of Fig. 1;

Fig. 3 is a section through the egg tray taken substantially on the line 3—3 of Fig. 1;

Fig. 4 is an enlarged view showing the action of the egg-turning device; and

Fig. 5 is a view in elevation of the hand-operable means for turning the eggs.

My improvements as mentioned above, are applicable to either a single or a multi-compartment incubator, and in the present example, I have illustrated them in connection with a mammoth incubator, three egg compartments 6, 7 and 8 of which are shown. Inasmuch as the construction of the parts in each egg compartment is identical, a description of one will suffice. It will be observed, however, that in the present instance the egg compartments are positioned side by side and each is accessible through a door 9 at its front. The several egg compartments may be heated by radiation from pipes 11 through a heated medium which is circulated; and the temperature may be controlled by any suitable or preferred means.

Referring more particularly to the egg compartment 6, it will be observed that there is positioned therein, in superimposed relation, a moisture pan 12, a nursery tray 13, and an egg-supporting tray designated generally by 14. My invention is particularly concerned with the construction of the egg-supporting tray and of means in conjunction therewith for turning the eggs. As is well known in this art, it is desired to turn the eggs regularly at certain intervals through a certain period of the incubation, and after, say the 18th day, the eggs are left to hatch. During the early stages of incubation, especially up to the 5th day, it is under certain temperature conditions desired that the eggs be supported in a particular position, that is, with the larger end up, in order that the germ will attach to the shell at the proper location near the air cell end of the egg and insure incubation and hatching. I have in the present instance so designed the egg-supporting tray as to insure a most favorable result and to enable turning the eggs in a simple and practical manner. I have further provided for shifting the position of the egg-supporting tray out of operative relation to the egg-turning means. This position is especially favorable for the hatching period after the 18th day, and permits the chicks to drop down through the egg tray to the nursery tray in a most effective manner.

In furtherance of the foregoing, I have provided an egg-supporting tray constructed preferably as follows. The tray comprises a rectangular frame 15 having transverse bars 16 upon which a sectional perforate bottom is supported. The frame 15 and bars 16 are at present of wood, the bars being covered, except at the ends, by sheet metal casings 17. The sectional egg-supporting bottom consists of an intermediate shiftable section 18 and end sections or gates 19 and 21. Said bottom sections may be of any suitable or preferred construction, and each is preferably formed, as shown, of a woven wire body, the marginal edges of which are bound by sheet metal strips. As shown in Fig. 3, the relatively narrow end sections or gates are supported on the end portions of the cross-bars 16 and the intermediate section is supported on the metal covered intermediate portion of said cross-bars. It will be observed that said sections extend from the front to the back of the egg tray in its position shown in Fig. 1, and that the intermediate section 18 is of less width than the tray, thereby permitting sidewise movement of said intermediate section, so that its ends will be carried back and forth over the end sections 19 and 21. This back and forth movement of the intermediate bottom section is preferably from side to side of the egg compartment 6, or in other words, in the longitudinal plane of the aligned egg compartments 6, 7 and 8, in order that the shiftable bottom sections in the respective egg compartments may be moved by a single member, such for example as a rod 22 extending through said compartments just below the egg trays. The shiftable section 18 carries a depending pin 23 normally disposed between the arms of a forked member 24 fixed to the rod 22. When this rod is moved back and forth by any suitable means, such as a hand lever 30, operable from one end of the incubator, the egg-supporting section 18 in each of the egg compartments will be correspondingly moved for the purpose of turning the eggs. In this regard, it will be noted that the eggs are positioned on end in the bottom of the egg tray between spacers 25, which extend from the front to the rear of the egg tray. These spacers, secured in spaced relation by end bars 26 which seat on the front and rear members of the tray frame, constitute a grid-like structure, removable at will from the tray frame, and adapted when in position thereon, to space the eggs in a particularly advantageous manner. That is, the eggs are positioned on the tray bottom on end between the spacers 25, as shown in Fig. 4, and in side by side abutting relation, thereby allowing a large egg capacity. When the bottom section 18 is shifted to the left from the position shown in Figs. 3 and 4, the eggs will be partially turned approximately 45 degrees or more, as indicated in dotted lines in Fig. 4. This turning of the eggs is sufficient, and by reason of the spacers or separators 25, the eggs are maintained in an upright position with the larger ends uppermost, which is very desirable during the early stages of incubation. This method of sustaining the eggs in an upright position is not however, essential to my invention; and fewer spacers or egg baffles 25 might be employed so that the eggs will rest on the tray bottom with the major axes horizontally disposed instead of vertically.

When starting a hatch, the egg trays in the respective compartments will be positioned as shown in Fig. 1, with the depending member 23 in operative engagement with the member 24 on the shiftable member 22. The eggs will be placed on the trays in the manner described and will be turned periodically by operation of the lever 30 as is well understood in this art. After the 18th day or thereabout, the grille or egg spacers may be removed from each tray. At this time the egg trays will be removed from their respective compartments, turned 90 degrees and replaced in the egg compartment, thus positioning either one or the other of the end gates 19 and 21 at the front of the compartment. This front end gate will be removed to provide a hatch opening down through which the chicks may drop to the nursery tray, it being understood that the bottom section 18 will be moved to its rearmost position, so as not to overlie the opening afforded by removal of the end gate. In this position the depending pin 23 is out of engagement with the member 24 as indicated by the dotted line position of said pin shown in the middle compartment of Fig. 1. This is due to the off-center location of the pin 23 on the tray which places the pin in operative relation to the shifting means when the tray is in one position and in inoperative relation thereto when in another position. It follows that by changing the position of any of the egg trays, they may be connected to or disconnected from the operating means for turning the eggs. In either position, the egg tray is in the same horizontal plane, and consequently the same distance from the heat radiating pipes.

It is believed that the foregoing conveys a clear understanding of the objects prefaced above, and while I have illustrated but a single working embodiment, it should be understood that changes might be made in details of construction without departing from the spirit and scope of the invention as expressed in the appended claims.

I claim:

1. In an incubator, in combination, an egg compartment, an egg tray therein having egg-turning means, and means operable from the exterior of the compartment for operating said egg-turning means, including means whereby said egg-turning means will be brought into and out of operative relation to said operating means by removal of the egg tray from the compartment, turning it 90 degrees, and re-positioning it in the compartment.

2. In an incubator, the combination with an egg compartment having a doorway through its front, of an egg tray adapted to be supported in said compartment and to be removed therefrom through said doorway, said tray having a sectional bottom comprising a comparatively narrow section adjacent to one side and a longer perforate section shiftable back and forth sidewise of the tray, said tray also having egg spacers extending from the front to the back, means for moving said shiftable bottom section back and forth for turning the eggs, said tray adapted to be removed from the egg compartment and replaced with said narrow section at the front of the compartment and moved from its normal position to afford an opening down through which the chicks may drop.

3. In an incubator, the combination with an egg compartment having a doorway through its front, of an egg tray adapted to be supported in said compartment and to be removed therefrom through said doorway, said tray having a sectional bottom comprising a comparatively narrow section adjacent to one side and a longer perforate section shiftable back and forth sidewise of the tray, said tray also having egg spacers extending from the front to the back, means for moving said shiftable bottom section back and forth for turning the eggs, said tray adapted to be removed from the egg compartment and replaced with said narrow section at the front of the compartment and moved from its normal position to afford an opening down through which the chicks may drop, said means for moving the shiftable section being out of operative relation thereto when the tray is in the position with the narrow bottom section at the front of the compartment.

ROY G. MILLER.